United States Patent
Ueki

(10) Patent No.: US 7,052,003 B2
(45) Date of Patent: May 30, 2006

(54) VIBRATION ISOLATING APPARATUS

(75) Inventor: Akira Ueki, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/512,427

(22) PCT Filed: Apr. 24, 2003

(86) PCT No.: PCT/JP03/05234

§ 371 (c)(1),
(2), (4) Date: May 12, 2005

(87) PCT Pub. No.: WO03/091597

PCT Pub. Date: Nov. 6, 2003

(65) Prior Publication Data

US 2005/0218570 A1    Oct. 6, 2005

(30) Foreign Application Priority Data

Apr. 25, 2002 (JP) .............................. 2002-123763

(51) Int. Cl.
*F16F 5/00* (2006.01)

(52) U.S. Cl. .............................................. 267/140.13

(58) Field of Classification Search ............ 267/140.13
See application file for complete search history.

(56) References Cited

U.S. PATENT DOCUMENTS

| 5,246,211 A | 9/1993 | Klein et al. | |
|---|---|---|---|
| 5,632,472 A * | 5/1997 | Kato et al. ............. | 267/140.13 |
| 6,349,927 B1 * | 2/2002 | Suzuki .................. | 267/140.13 |
| 6,439,554 B1 * | 8/2002 | Takashima et al. .... | 267/140.13 |
| 6,592,111 B1 * | 7/2003 | Nishi et al. ............ | 267/140.13 |

FOREIGN PATENT DOCUMENTS

| JP | 60-073147 A | 4/1985 |
|---|---|---|
| JP | 60-227032 A | 11/1985 |
| JP | 63-152936 U | 10/1988 |
| JP | 01-193425 A | 8/1989 |
| JP | 2-119540 U | 9/1990 |

* cited by examiner

*Primary Examiner*—Christopher P. Schwartz
(74) *Attorney, Agent, or Firm*—Sughrue Mion, PLLC

(57) ABSTRACT

A vibration isolating apparatus is provided which can reduce the manufacturing costs thereof. A space defined by an elastic body and a partitioning member 28 forms a main liquid chamber 30. A non-return valve 34 is provided which allows flow-in of liquid only from the main liquid chamber 30 side via a pass-through hole 24A of an upper member 24 forming the upper portion of the partitioning member 28. A plunger 36 is disposed within an annular rib 24B of the upper member 24 so as to be fit with the inner wall surface of the annular rib 24B in a slidable manner. A coil spring 38 for urging the plunger 36 upward is disposed between the plunger 36 and the bottom surface central portion of a lower member 26 forming the lower portion of the partitioning member 28.

7 Claims, 2 Drawing Sheets

VIBRATION ISOLATING APPARATUS

TECHNICAL FIELD

The present invention relates to a vibration isolating apparatus that prevents transmission of vibration from a member that generates vibration, and particularly to a fluid-sealed vibration isolating apparatus that is applicable to an engine mount or bush of an automobile.

RELATED ART

For example, a structure is known in which a vibration isolating apparatus serving as an engine mount is disposed between a vehicle engine which is a vibration generating portion and a vehicle body which is a vibration receiving portion, and vibration generated by the engine is absorbed by this vibration isolating apparatus and is prevented from being transmitted to the vehicle body.

As an example of this vibration isolating apparatus, there has been conventionally known a vibration isolating apparatus serving as a control mount having a structure that allows switching of orifices filled with liquid, which orifices serve as a liquid passage, so as to correspond to vibrations over a wide range of frequencies.

In other words, this vibration isolating apparatus not only requires an electric actuator or an electromagnetic valve used to switch between a plurality of orifices, but also requires a controller for switching between the orifices by operating the actuator or electromagnetic valve as described above based on running conditions of a vehicle, from the aspect of the structure of the apparatus.

However, the aforementioned actuator, electromagnetic valve, and controller are relatively expensive and results in an increase of manufacturing cost of the vibration isolating apparatus.

DISCLOSURE OF THE INVENTION

In view of the aforementioned, an object of the present invention is to provide a vibration isolating apparatus that allows reduction in the manufacturing costs.

A vibration isolating apparatus according to claim 1 comprises: a first mounting member connected to one of a vibration generating portion and a vibration receiving portion; a second mounting member connected to the other of the vibration generating portion and the vibration receiving portion; an elastic body that is disposed between the first mounting member and the second mounting member and that is elastically deformable; a main liquid chamber having a partitioning wall, a portion of which is formed by the elastic body, the main liquid chamber being filled with liquid, and the content volume of the main liquid chamber being changed due to deformation of the elastic body; an auxiliary liquid chamber having a partitioning wall at least a portion of which is formed in a deformable manner, the auxiliary liquid chamber being filled with liquid; an orifice that connects the main liquid chamber and the auxiliary liquid chamber; a switching member that is disposed so as to be capable of moving reciprocally within a space including a portion of the orifice and that opens and closes the orifice due to reciprocating movement of the switching member; a non-return valve that is disposed between the main liquid chamber and the switching member and allows flowing of liquid from the main liquid chamber only to the switching member side; and an elastic member that urges the switching member to the side of the non-return valve.

A vibration isolating apparatus according to claim 2 is characterized by that, in the vibration isolating apparatus of claim 1, two orifices are provided, and the orifice opened and closed by the switching member serves as an idle orifice, and the other orifice serves as a shake orifice which is narrower than the idle orifice and which is longer than the idle orifice.

A vibration isolating apparatus according to claim 3 is characterized by that, in the vibration isolating apparatus of claim 1, a partitioning member is disposed between the main liquid chamber and the auxiliary liquid chamber so as to partition these liquid chambers, and an orifice is formed and the switching member is disposed so as to move reciprocally within the partitioning member.

A vibration isolating apparatus according to claim 4 is characterized by that, in the vibration isolating apparatus of claim 1, the elastic member is a metal spring.

A vibration isolating apparatus according to claim 5 is characterized by that, in the vibration isolating apparatus of claim 4, the spring is a coil spring.

A vibration isolating apparatus according to claim 6 is characterized by that, in the vibration isolating apparatus of claim 1, the first mounting member is connected to one of an engine that is the vibration generating portion and a vehicle body that is the vibration receiving portion, and the second mounting member is connected to the other of the engine and the vehicle body.

A vibration isolating apparatus according to claim 7 is characterized by that, in the vibration isolating apparatus of claim 6, the switching member moves reciprocally so as to make the orifice into an open state in an idle mode corresponding to an idle state of the engine, and to make the orifice into a closed state in a shake mode corresponding to a traveling state of a vehicle.

The operation of the vibration isolating apparatus according to claim 1 will be hereinafter described.

When vibration is transmitted from the side of the vibration generating portion connected to any one of a pair of mounting members, the elastic body disposed between the pair of mounting members is elastically deformed along with displacement of the one of the mounting members. The vibration is absorbed by the damping function based on the internal friction of the elastic body, and the vibration is reduced. That is, due to the vibration being absorbed by deformation of the elastic body, the vibration is not easily transmitted to the side of the vibration receiving portion connected to the other of the mounting members.

In the aforementioned present claim, the main liquid chamber having a partitioning wall, a portion of which is formed by the elastic body, which is filled with liquid, and the auxiliary liquid chamber having a partitioning wall at least a portion of which is formed so as to be elastically deformable and which is filled with liquid are connected by the orifice. Further, the switching member is disposed in a space including a portion of the orifice so as to move reciprocally therein. The non-return valve disposed between the main liquid chamber and the switching member allows the liquid to flow only from the main liquid chamber to the switching member side, and the elastic member urges the switching member toward the non-return valve.

Accordingly, due to the deformation of the elastic body, which occurs along with vibration being applied to the vibration isolating apparatus, the main liquid chamber filled with liquid expands and contracts so that the content volume thereof changes, and the switching member moves reciprocally due to a change in pressure of the liquid, which is caused according to the change in the content volume of the main liquid chamber, and operates to open and close the orifice.

In other words, in a case in which vibration having a small amplitude is input to the vibration isolating apparatus, the switching member is in a stationary state with the non-return valve being in a closed state because the compressive preload of the elastic member that urges the switching member toward the non-return valve is larger than a force generated by the change in pressure of the liquid in the main liquid chamber. At the same time, the orifice is brought into an open state, and the liquid flows from the main liquid chamber into the orifice. As a result, the liquid moves in the orifice in such a state that the pressure of the liquid changes and/or the viscous resistance thereof are generated, and the liquid flows between the main liquid chamber and the auxiliary liquid chamber. Accordingly, the vibration is reduced also by the liquid-column resonance and/or viscous resistance of the liquid, and the vibration is not easily transmitted to the side of the vibration receiving portion even more.

On the other hand, when vibration having a relatively large amplitude is input to the vibration isolating apparatus, the force generated by the change in pressure of the liquid in the main liquid chamber becomes large and it becomes larger than the compressive preload of the elastic member. Therefore, the non-return valve is opened and the switching member is pushed by the liquid flowing in from the main liquid chamber and moves to the side of the elastic member against the urging force of the elastic member, and then, is brought into a stationary state at which the maximum value of the change in pressure of the liquid in the main liquid chamber and the urging force of the elastic member match with each other. Due to the switching member moving toward the elastic member, a portion of the orifice is shut off by the switching member so as to prevent flowing of the liquid in the orifice.

Due to the aforementioned structure, the vibration isolating apparatus according to the present claim makes it possible to reduce vibrations over the wide range, in the same manner as in a conventional vibration isolating apparatus, by switching the orifice even if an actuator, an electromagnetic valve, or a controller is not used. Accordingly, according to the aforementioned claim, it is possible to reduce the manufacturing costs while maintaining the vibration isolating property of the vibration isolating apparatus.

Next, operation of the vibration isolating apparatus according to claim 2 will be described.

The same structure and operation as those of claim 1 are provided in the present claim as well, further, two orifices are provided. The orifice opened and closed by the switching member serves as an idle orifice, and the other orifice serves as a shake orifice whose passage sectional area is smaller than that of the idle orifice and whose passage length is longer than that of the idle orifice.

In other words, in the aforementioned structure, two orifices are provided, and the orifice opened and closed by the switching member according to claim 1 is formed as the idle orifice, and the other orifice is formed as a shake orifice whose passage sectional area is smaller than that of the idle orifice and whose passage length is longer than that of the idle orifice, so as to allow reduction of vibration having a large amplitude and a low frequency, which vibration cannot be reduced by the idle orifice.

Accordingly, even when the vibration having an amplitude and a frequency, which cannot be reduced by the idle orifice, is generated, the vibration is reduced by the liquid-column resonance and/or viscous resistance of the liquid in the shake orifice. As a result, even if the vibration having any type of amplitude or frequency is input, the liquid actively flows between the main liquid chamber and the auxiliary liquid chamber via these two orifices, and the vibrations are reduced over the wide ranges of amplitudes and frequencies.

In the state in which the idle orifice is opened, the liquid flows from the main liquid chamber into the idle orifice and the shake orifice, respectively. The passage sectional area of the idle orifice is larger than that of the shake orifice and the passage length of the idle orifice is shorter than that of the shake orifice. Therefore, a greater part of the liquid flows between the main liquid chamber and the auxiliary liquid chamber via the idle orifice. When the switching member moves toward the elastic member in the same manner as in claim 1, a portion of the orifice, that is, the idle orifice is shut off by the switching member, and the liquid actively flows in the shake orifice.

A description will be hereinafter given of operation of the vibration isolating apparatus according to claim 3.

Although the present claim also has the same structure and operation as those of claim 1 and claim 2, a partitioning member is further disposed which partitions the main liquid chamber and the auxiliary liquid chamber. An orifice is formed in the partitioning member, and the switching member is also disposed therein so as to be reciprocally movable.

In other words, according to the present claim, the orifice is formed in the partitioning member that partitions the main liquid chamber and the auxiliary liquid chamber and the switching member is also disposed therein. As a result, an additional space required for the orifice and the switching member to be disposed therein becomes unnecessary, and the vibration isolating apparatus can be made smaller.

Next, operation of the vibration isolating apparatus according to claim 4 will be described.

Although the present claim also has the same structure and operation as those of claims 1 to 3, a structure is further provided in which the elastic member is a metal spring.

In other words, according to the present claim, since the elastic member is a metal spring, the elastic coefficient of the spring can be set permanently at a fixed value, the durability of the vibration isolating apparatus would be improved.

Next, operation of the vibration isolating apparatus according to claim 5 will be described.

Although the present claim also has the same structure and operation as those of claim 4, a structure is further provided in which the spring is a coil spring.

In other words, according to claim 5, since the spring is a coil spring, the liquid passage can be disposed in the inner peripheral portion of the coil spring, and the vibration isolating apparatus can be made smaller even more.

Next, operation of the vibration isolating apparatus according to claim 6 will be described.

Although the present claim also has the same structure and operation as those of claims 1 to 5, the first mounting member is connected to one of the engine that is a vibration generating portion, and a vehicle body that is a vibration receiving portion, and the second mounting member is connected to the other of the engine and the vehicle body.

In other words, the present claim shows a case in which the vibration isolating apparatus is applied to an engine mount of an automobile. In this case as well, the vibration isolating apparatus reliably operates and the operational effects of claim 1 can be achieved.

Next, operation of the vibration isolating apparatus according to claim 7 will be described.

Although the present claim has the same structure and operation as those of claim 6, the switching member moves reciprocally so as to make the orifice into an open state in an idle mode corresponding to an idle state of the engine and to make the orifice into a closed state in a shake mode corresponding to the time of a vehicle traveling.

In other words, according to the present claim, along with the state in which the orifice is opened and closed by the switching member, the orifice can be reliably brought into a closed state at the time of the shake mode in which the orifice essentially needs to be closed.

BEST MODE FOR CARRYING OUT THE INVENTION

Figure 1:
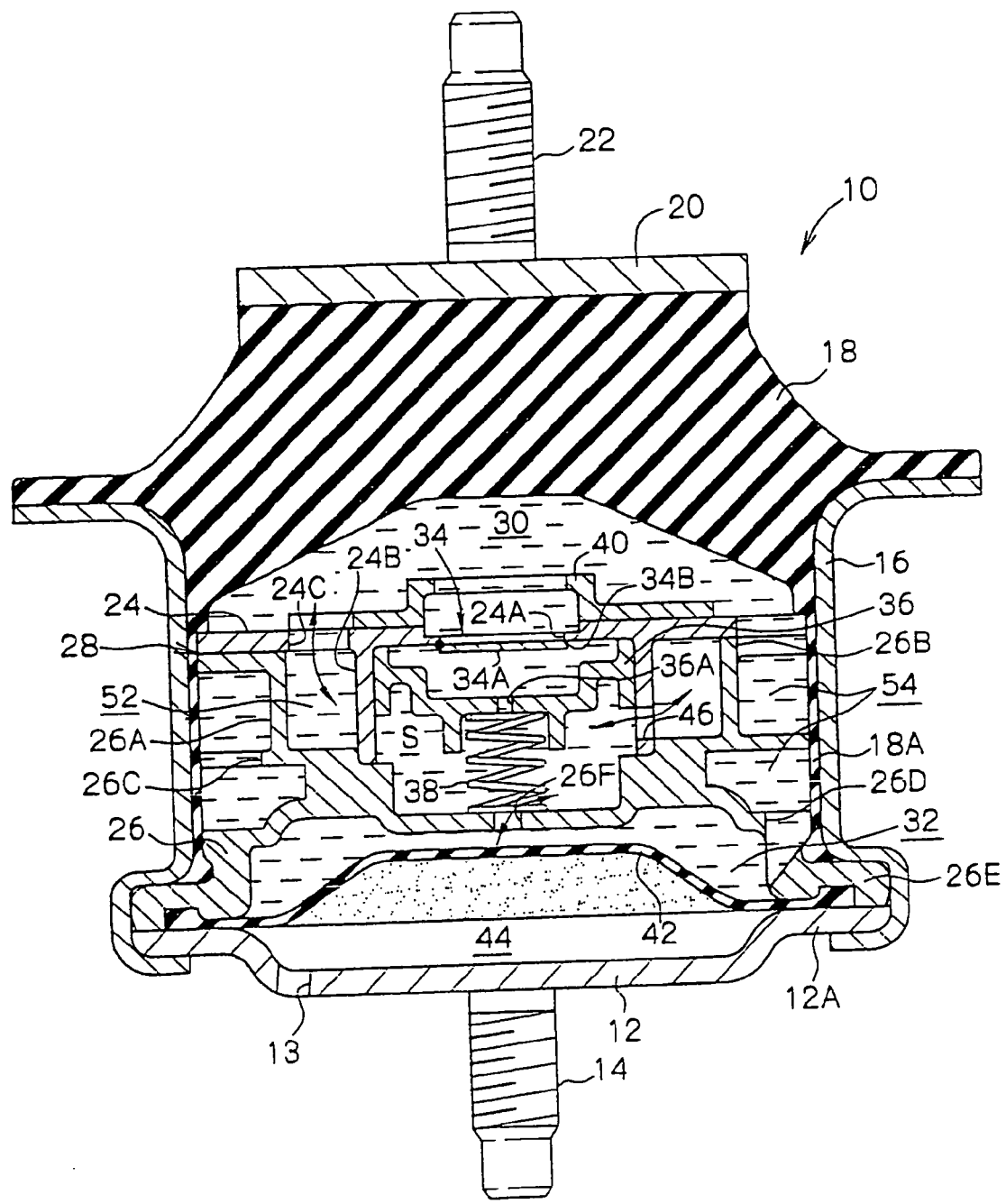
FIG. 1 is a cross-sectional view of a vibration isolating apparatus according to an embodiment of the present invention, which view illustrating an idle mode.
Figure 2:
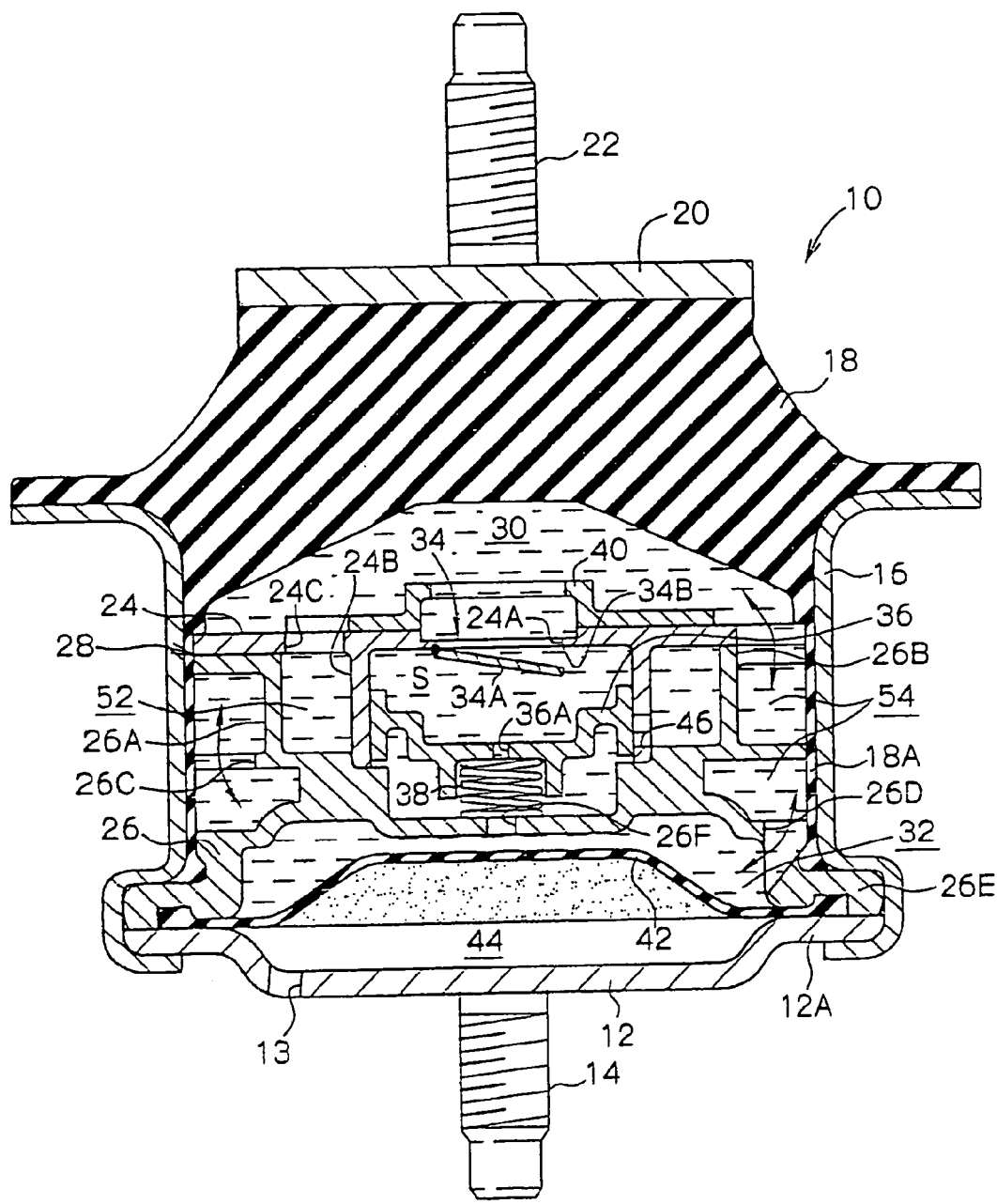
FIG. 2 is a cross-sectional view of a vibration isolating apparatus according to an embodiment of the present invention, which view illustrating a shake mode.

Next, a vibration isolating apparatus according to an embodiment of the present invention is illustrated in FIGS. 1 and 2, and the present embodiment will be described on the basis of the drawings.

As shown in FIGS. 1 and 2, which represent the present embodiment, a lower portion of a vibration isolating apparatus 10 is formed by a dish-shaped bottom plate metal fitting 12 serving as a first mounting member. A bolt 14 for connecting and adhering the vibration isolating apparatus 10 to an unillustrated vehicle body is provided at the lower portion of the bottom plate metal fitting 12. A flange portion 12A is provided at the outer side of the bottom plate metal fitting 12. An outer cylinder metal fitting 16, which has a cylindrical shape and is formed so that the upper portion is wide in a flange manner, is disposed at the upper portion of the flange portion 12A.

A thin rubber layer 18A that forms a lower portion of a cylindrical elastic body 18 made of rubber is bonded by vulcanization to the inner circumferential surface of the outer cylinder metal fitting 16. The upper central portion of this elastic body 18 is bonded by vulcanization to a top plate metal fitting 20 serving as a second mounting member. A bolt 22, which is used for connecting an unillustrated engine, protrudes upward from the central portion of the top plate metal fitting 20.

A partitioning member 28 is disposed at a lower portion of the elastic body 18. A space is provided between the elastic body 18 and the partitioning member 28. The partitioning member 28 is fitted with the inner side of the outer cylinder metal fitting 16 via the thin rubber layer 18A. The space defined by the elastic body 18 and the partitioning member 28 forms a main liquid chamber 30 and is filled with a liquid such as water, oil, ethylene glycol, or the like. Accordingly, a partitioning wall of the main liquid chamber 30, which is filled with a liquid, is formed by the elastic body 18 and the partitioning member 28.

The partitioning member 28 is constituted in such a manner that an upper member 24 and a lower member 26 are combined with each other, which members are each formed into a circular plate and made from a synthetic resin or a metal such as aluminum or the like. A through hole 24A is formed at the center of the upper member 24 that forms the upper portion of the partitioning member 28. Further, the upper member 24 also includes an annular rib 24B that extends downward in the shape of a ring so as to surround the through hole 24A. A valve body 34A that is slightly larger than the through hole 24A is mounted at the lower portion of the through hole 24A of the upper member 24 via a hinge portion so as to be openable and closable. When the valve body 34A is closed, the through hole 24A is completely closed by the valve body 34A.

Accordingly, the valve body 34A is made to be openable downward from the through hole 24A. A peripheral wall surface of the through hole 24A, with which the valve body 34A comes into contact, is formed as a valve seat 34B. Thus, the valve body 34A and the valve seat 34B form a non-return valve 34 that allows only the flow of a liquid from the main liquid chamber 30. Further, a ring-shaped cover member 40 is disposed at the upper side of the upper member 24 in the state of firmly adhering to the upper surface of the upper member 24.

A circumferential groove forming portion 26A is provided in the circumferential upper portion of the lower member 26 forming the lower portion of the partitioning member 28, and has a W-shaped configuration in which a two-tiered groove-like space is provided at the circumferential side of the lower member 26. Further, a first communicating portion 26B is formed by cutting out a portion of the upper wall of the circumferential groove forming portion 26A, and a second communicating portion 26C is formed by cutting out a portion of the central wall portion of the circumferential groove forming portion 26A in the vertical direction. A third communicating portion 26D is formed by opening a portion of the lower wall of the circumferential groove forming portion 26A.

Further, as shown in FIGS. 1 and 2, the upper member 24 and the lower member 26 are combined with each other in such a state that the upper surface of the circumferential groove forming portion 26A comes in contact with the lower surface of the upper member 24 and the annular rib 24B of the upper member 24 comes in contact with a portion of the lower member 26 at the inner peripheral side, thereby forming the partitioning member 28. A space inside the annular rib 24B is formed as a cylinder space S.

A plunger 36 serving as an opening and closing member and made from, for example, a synthetic resin in a disk shape is disposed within the annular rib 24B of the upper member 24 in a state of being slidably fit with the inner wall surface of the annular rib 24B. A small through hole 36A is formed at the central portion of the plunger 36 and allows flowing of a liquid.

A coil spring 38 for urging the plunger 36 upward, that is an elastic member made of metal, is disposed between the plunger 36 and the bottom surface central portion of the lower member 26 forming the lower portion of the partitioning member 28, which central portion is formed so as to be sunk in on the bottom surface of the lower member 26. In other words, the plunger 36 moves upward in the state of being urged by the coil spring 38, or moves downward against the urging force of the coil spring 38.

Further, a sandwich-hold portion 26E is formed in the lower portion of the lower member 26 so as to protrude toward the outer periphery from the lower portion of the lower member 26. The sandwich-hold portion 26E of the lower member 26 is in the state of being nipped between the lower portion of the outer cylinder metal fitting 16 and the flange portion 12A of the bottom plate metal fitting 12. Since the lower portion of the outer cylinder metal fitting 16 is caulked to the outer circumferential portion of the flange portion 12A of the bottom plate metal fitting 12, the bottom plate metal fitting 12, the outer cylinder metal fitting 16, and the partitioning member 28 are fixed integrally.

Moreover, a circumferential edge portion of a diaphragm 42, which is formed as an elastic membrane, that is made of rubber and is elastically deformable, is held between the sandwich-hold portion 26E of the partitioning member 28 and the flange portion 12A of the bottom plate metal fitting 12. As a result, the thin diaphragm 42 is disposed between the partitioning member 28 and the bottom plate metal fitting 12. A space between the diaphragm 42 and the lower surface of the partitioning member 28 serves as an auxiliary liquid chamber 32, and a space between the lower side of the diaphragm 42 and the bottom portion of the bottom plate metal fitting 12 serves as an air chamber 44. The air chamber 44 communicates with the atmosphere through an air hole 13 formed in the bottom plate metal fitting 12, and the diaphragm 42 is easily deformed by the air chamber 44.

Provided between the upper member 24 and the lower member 26 in the partitioning member 28 is a large-diameter passage that is a ring-shaped space interposed between the inner peripheral wall portion of the circumferential groove forming portion 26A and the annular rib 24B. Further, a pass-through portion 46 is formed in the vicinity of the tip end of the annular ring 24B of the upper member 24 forming the partitioning member 28 so as to pass through the annular rib 24B. The aforementioned large-diameter passage and a cylinder space S within the annular rib 24B are connected to each other via the pass-through portion 46.

In addition, a first opening portion 24C is formed in the upper member 24 to connect the main liquid chamber 30 and the aforementioned large-diameter passage. A second opening portion 26F is formed in the lower member 26 at a position corresponding to an inner peripheral portion of the lower member 26, in which the coil spring 38 is disposed, and connects the cylinder space S and the auxiliary liquid chamber 32.

Due to this structure, a space connected to the main liquid chamber 30 via the first opening portion 24C, connected to the auxiliary liquid chamber 32 via the second opening portion 26F, and within which communicating is made by the pass-through portion 46 passing through the annular rib 24B serves as an idle orifice 52 and the idle orifice 52 serves as a restricting passage for absorbing idle vibration.

On the other hand, as shown in FIGS. 1 and 2, the two groove-shaped spaces of the circumferential groove forming portion 26A having a two-tiered configuration are each formed on the outer circumferential surface of the partitioning member 28 along the circumferential direction of the partitioning member 28. These two groove-shaped spaces are connected to each other by the aforementioned second communicating portion 26C. A passage defined by the groove-shaped spaces of the circumferential groove forming portion 26A and the inner peripheral surface of the thin rubber layer 18A is formed as a shake orifice 54 serving as a restricting passage for absorbing shake vibration. One end side of the shake orifice 54 is connected to the main liquid chamber 30 via the first communicating portion 26B and an open portion of the upper member 24, and the other end side of the shake orifice 54 is connected to the auxiliary liquid chamber 32 via the third communicating portion 26D.

Due to the aforementioned structure, in the vibration isolating apparatus 10 according to the present embodiment, the main liquid chamber 30 and the auxiliary liquid chamber 32 communicate with each other via the idle orifice 52 and the shake orifice 54. However, when the plunger 36 that is fit in the cylinder space S in a slidable manner moves downward, the pass-through portion 46 is sealed and the idle orifice 52 is closed. Accordingly, due to the position of the plunger 36 being switched so that the plunger 36 is moved between the position at which the plunger 36 moves upward to open the idle orifice 52 (see FIG. 1), and the position at which the plunger 36 moves downward to close the idle orifice 52 (see FIG. 2), the idle orifice 52 is opened and closed.

Incidentally, in the present embodiment, the passage length of the shake orifice 54 is longer than the passage length of the idle orifice 52, and the passage sectional area of the shake orifice 54 is smaller than the passage sectional area of the idle orifice 52. In other words, a liquid-column resonance frequency in the restricting passage is determined based on the length or sectional area of the orifice, and therefore, the differences between these orifices are made as described above.

Next, operation of the vibration isolating apparatus 10 according to the present embodiment will be described.

When an engine mounted on the top plate metal fitting 20 is started, the vibration of the engine is transmitted to the elastic body 18 via the top plate metal fitting 20. The elastic body 18 acts as a vibration absorbing main body, and absorbs the vibration by the damping function based on the internal friction of the elastic body 18, and is not easily transmitted to the vehicle body side.

Further, the content volume of the main liquid chamber 30, a portion of a partitioning wall of the main liquid chamber 30 being formed by the elastic body 18, changes as the elastic body 18 deforms, and the liquids in the two orifices 52 and 54 communicating the main liquid chamber 30 and the auxiliary liquid chamber 32 change in pressure. To this end, due to deformation of the diaphragm 42 that forms a portion of the partitioning wall of the auxiliary liquid chamber 32 in a deformable manner, the auxiliary liquid chamber 32 expands and contracts, and the liquids within the orifices 52 and 54 between the main liquid chamber 30 and the auxiliary liquid chamber 32 move back and forth.

Not only at least the idle orifice 52 of the two orifices 52 and 54 is formed in the partitioning member 28 that is disposed so as to partition the main liquid chamber 30 and the auxiliary liquid chamber 32, but also the plunger 36 is disposed in the partitioning member 28 in such a manner as to move reciprocally within the cylinder space S including a portion of the idle orifice 52. The non-return valve 34 is disposed between the main liquid chamber 30 and the plunger 36 and causes the liquid to flow only in the direction from the main liquid chamber 30 to the plunger 36 side. Further, the coil spring 38 urges the plunger 36 toward the non-return valve 34.

Accordingly, due to deformation of the elastic body 18 resulting from that the vibration is applied to the vibration isolating apparatus 10, the main liquid chamber 30 filled with a liquid expands and contracts and the content volume thereof changes. At the same time, the plunger 36 moves reciprocally in the vertical direction within the cylinder space S due to the fluctuation in liquid pressure, that is caused by the change in the content volume of the main liquid chamber 30, and the pass-through portion 46 is opened and closed accordingly. As a result, the idle orifice 52 is operated so as to open and close.

As a result, when the vibration from the engine is transmitted, the vibration is damped not only by the elastic body 18, but also by the damping function based on the viscous resistance and liquid-column resonance of the liquid flowing in the orifices 52 and 54 connecting the main liquid chamber 30 and the auxiliary liquid chamber 32, the vibration is not easily transmitted to the vehicle body. Moreover, the idle orifice 52 that is opened and closed by the vertical movement of the plunger 36 is provided in addition to the shake orifice 54 that is constantly in an open state, and consequently, the apparatus of the present invention operates as described below.

A description will be hereinafter given of a specific operation of the vibration isolating apparatus 10 according to the present embodiment.

For example, when a vehicle stops traveling, an engine is brought into an idle state (idle mode) and idle vibration (20 to 40 Hz) having a high frequency and a small amplitude is generated and applied to the vibration isolating apparatus 10. In this case, a compressive preload of the coil spring 38 that urges the plunger 36 toward the non-return valve 34 is larger than a force generated by the fluctuation in the liquid pressure of the main liquid chamber 30. Therefore, the non-return valve 34 is brought into a closed state as shown in FIG. 1, and the plunger 36 is pushed up by the coil spring 38 and is in a stationary state at an upper side of the cylinder space S.

Accompanied with the state in which the plunger 36 is brought into a stationary state at the upper side of the cylinder space S and the pass-through portion 46 is opened, the liquid passing through the pass-through portion 46 and the second opening portion 26F is allowed to flow within the cylinder space S and the idle orifice 52 is brought into an open state. Accordingly, the main liquid chamber 30 and the auxiliary liquid chamber 32 communicate with each other via the idle orifice 52, and the liquid can move reciprocally in the idle orifice 52. As a result, due to the liquid-column resonance of the liquid in the idle orifice 52, or the like, the dynamic spring constant of the vibration isolating apparatus 10 is reduced and the idle vibration is absorbed.

Further, in the present embodiment, the second opening portion 26F is located in the inner peripheral portion of the coil spring 38, and therefore, the liquid passage can be disposed in the inner peripheral portion of the coil spring 38. Incidentally, in the state in which the idle orifice 52 is opened, the liquid flows from the main liquid chamber 30 into the idle orifice 52 and the shake orifice 54, respectively. The passage sectional area of the idle orifice 52 is larger than that of the shake orifice 54, and the passage length of the idle orifice 52 is shorter than that of the shake orifice 54, and therefore, a greater part of the liquid would flow between the main liquid chamber 30 and the auxiliary liquid chamber 32 via the idle orifice 52.

On the other hand, for example, when a relatively larger vibration than the idle vibration is inputted due to a vehicle running over a bump or the like, in the engine, it is excited to generate forced vibration (shake vibration: less than 15 Hz) of a frequency determined by the weight and a supporting spring of an engine mount, and the vibration is applied to the vibration isolating apparatus 10. As a result, the force generated by the fluctuation in the liquid pressure of the main liquid chamber 30 becomes large and it becomes larger than the compressive preload of the coil spring 38. Accordingly, the valve body 34A is opened downward around the hinge portion, and at the same time, the liquid flows in from the main liquid chamber 30, and the plunger 36 is pushed by the flowing liquid and moved downward to the coil spring 38 side against the urging force of the coil spring 38, as shown in FIG. 2. Then, the plunger 36 is brought into a stationary state at a position in which the maximum value of the liquid pressure fluctuation of the main liquid chamber 30 and the urging force of the coil spring 38 match with each other.

Further, the pass-through portion 46 is closed by the outer peripheral portion of the plunger 36, and the idle orifice 52 is brought into a closed state in which a portion thereof is reliably shut off, and the main liquid chamber 30 and the auxiliary liquid chamber 32 are made to communicate with each other only via the shake orifice 54. As a result, the liquid actively moves reciprocally in the shake orifice 54 and undergoes transit resistance, or liquid-column resonance of the liquid occurs. As a result, the shake vibration is absorbed.

Subsequently, when the amplitude of the vibration inputted to the vibration isolating apparatus 10 again becomes small, the valve body 34A is closed, and the liquid passes through the through hole 36A and a clearance between the annular rib 24B and the plunger 36. As a result, the plunger 36 returns again to the position at the upper side of the cylinder space S as shown in FIG. 1.

As described above, in the vibration isolating apparatus 10 according to the present embodiment, the shake orifice 54 is provided in such a manner that the passage sectional area thereof is smaller than that of the idle orifice 52 and the passage length thereof is longer than that of the idle orifice 52, in addition to the idle orifice 52 opened and closed by the plunger 36. Therefore, vibrations having a large amplitude and a low frequency, that cannot be reduced by the idle orifice 52, can be reduced by the shake orifice 54. Accordingly, even in a case of the vibrations having such amplitude and frequency that cannot be reduced by the idle orifice 52, they can be reduced by the liquid-column resonance or viscous resistance of the liquid within the shake orifice 54.

In other words, the amplitude or frequency of vibrations generated at the engine at the time of a vehicle traveling is different from that at the time of the vehicle stopping. However, even if an actuator, an electromagnetic valve, or a controller is not used, these two orifices 52 and 54 are switched and the characteristics of the vibration isolating apparatus 10 are varied depending on the differences in the amplitude or frequency of vibration, thereby making it possible to absorb vibrations over the wide range of amplitudes and frequencies.

Accordingly, the vibration isolating apparatus 10 according to the present embodiment makes it possible to reduce the manufacturing costs while maintaining the vibration isolating property.

Further, in the present embodiment, the idle orifice 52 is formed and the plunger 36 is also disposed in the partitioning member 28 that partitions the main liquid chamber 30 and the auxiliary liquid chamber 32. As a result, an additional space required by the idle orifice 52 and the plunger 36 to be disposed therein becomes unnecessary, and the vibration isolating apparatus 10 can be made smaller.

Moreover, as the elastic member, the coil spring 38 is used selectively from various types of metal spring. Therefore, not only the durability of the vibration isolating apparatus 10 improves with the elastic coefficient of the spring being permanently set at a fixed value, but also the liquid passage can be disposed in the inner peripheral portion of the coil spring 38. As a result, the vibration isolating apparatus 10 can be made even smaller.

In the aforementioned embodiment, a structure is provided in which the top plate metal fitting 20 is connected to an engine that is a vibration generating portion, and the bottom plate metal fitting 12 is connected to a vehicle body that is a vibration receiving portion, but the opposite structure may be used.

Additionally, in the aforementioned embodiment, the vibration isolating apparatus of the present invention is intended for isolation of vibration of an automobile engine or the like, but may be of course used for other applications. Further, the shape or the like of the apparatus is not limited to the structure provided by the present embodiment, and is also applicable to vibration isolating apparatuses having other structures.

Effects of the Invention

As described above, the vibration isolating apparatus of the present invention has the aforementioned structure, and therefore, has an excellent effect of making it possible to reduce the manufacturing costs thereof.

What is claimed is:

1. A vibration isolating apparatus comprising:
   a first mounting member connected to one of a vibration generating portion and a vibration receiving portion;
   a second mounting member connected to the other of the vibration generating portion and the vibration receiving portion;
   an elastic body that is disposed between the first mounting member and the second mounting member and that is elastically deformable;
   a main liquid chamber having a partitioning wall, a portion of which is formed by the elastic body, the main liquid chamber being filled with liquid, and the content volume of the main liquid chamber being changed due to deformation of the elastic body;
   an auxiliary liquid chamber having a partitioning wall at least a portion of which is formed in a deformable manner, the auxiliary liquid chamber being filled with liquid;
   an orifice that connects the main liquid chamber and the auxiliary liquid chamber;
   a switching member that is disposed so as to be capable of moving reciprocally within a space including a portion of the orifice and that opens and closes the orifice due to reciprocating movement of the switching member;
   a non-return valve that is disposed between the main liquid chamber and the switching member and allows flowing of liquid from the main liquid chamber only towards the switching member; and
   an elastic member that urges the switching member to the side of the non-return valve.

2. The vibration isolating apparatus according to claim 1, wherein two orifices are provided, and the orifice opened and closed by the switching member serves as an idle orifice, and the other orifice serves as a shake orifice which is narrower than the idle orifice and which is longer than the idle orifice.

3. The vibration isolating apparatus according to claim 1, wherein a partitioning member is disposed between the main liquid chamber and the auxiliary liquid chamber so as to partition these liquid chambers, and an orifice is formed and the switching member is disposed so as to move reciprocally within the partitioning member.

4. The vibration isolating apparatus according to claim 1, wherein the elastic member is a metal spring.

5. The vibration isolating apparatus according to claim 4, wherein the spring is a coil spring.

6. The vibration isolating apparatus according to claim 1, wherein the first mounting member is connected to one of an engine that is the vibration generating portion and a vehicle body that is the vibration receiving portion, and the second mounting member is connected to the other of the engine and the vehicle body.

7. The vibration isolating apparatus according to claim 6, wherein the switching member moves reciprocally so as to make the orifice into an open state in an idle mode corresponding to an idle state of the engine, and to make the orifice into a closed state in a shake mode corresponding to a traveling state of a vehicle.

* * * * *